(12) United States Patent
Sahai (10) Patent No.: US 7,957,514 B2
(45) Date of Patent: Jun. 7, 2011

(54) SYSTEM, METHOD AND COMPUTER PROGRAM PRODUCT FOR CONVEYING PRESENCE INFORMATION VIA VOICE MAIL

(75) Inventor: Shankar Sahai, Fremont, CA (US)

(73) Assignee: Paltalk Holdings, Inc., New York, NY (US)

( * ) Notice: Subject to any disclaimer, the term of this patent is extended or adjusted under 35 U.S.C. 154(b) by 2091 days.

(21) Appl. No.: 09/737,583

(22) Filed: Dec. 18, 2000

(65) Prior Publication Data

US 2002/0076010 A1    Jun. 20, 2002

(51) Int. Cl.
H04M 3/42 (2006.01)
(52) U.S. Cl. ........... 379/207.16; 379/88.19; 379/127.01; 379/209.01; 379/265.05; 370/401
(58) Field of Classification Search ............... 379/32.01, 379/67.1, 69, 88.08, 88.19, 88.2, 88.21, 88.22, 379/88.23, 88.24, 106.01, 106.02, 106.11, 379/142.1, 209.01, 210.01, 88.04, 121.01, 379/127.01, 142.08; 370/401
See application file for complete search history.

(56) References Cited

U.S. PATENT DOCUMENTS

| | | | | |
|---|---|---|---|---|
| 4,601,064 A | * | 7/1986 | Shipley | 359/172 |
| 4,649,385 A | * | 3/1987 | Aires et al. | 379/56.3 |
| 4,932,050 A | * | 6/1990 | Davidson et al. | 379/211.02 |
| 5,210,789 A | * | 5/1993 | Jeffus et al. | 379/127.01 |
| 5,363,425 A | * | 11/1994 | Mufti et al. | 379/201.06 |
| 5,548,637 A | * | 8/1996 | Heller et al. | 379/201.07 |
| 5,596,633 A | * | 1/1997 | Meier et al. | 379/201.1 |
| 5,625,682 A | * | 4/1997 | Gray et al. | 379/207.16 |
| 5,666,405 A | * | 9/1997 | Weber | 379/127.03 |
| 5,742,674 A | * | 4/1998 | Jain et al. | 379/210.01 |
| 5,822,418 A | * | 10/1998 | Yacenda et al. | 379/201.07 |
| 5,859,901 A | * | 1/1999 | Brendzel et al. | 379/121.01 |
| 6,009,149 A | * | 12/1999 | Langsenkamp | 379/69 |
| 6,160,881 A | * | 12/2000 | Beyda et al. | 379/209.01 |
| 6,173,042 B1 | * | 1/2001 | Wu | 379/88.04 |
| 6,195,418 B1 | * | 2/2001 | Ridgley | 379/88.23 |
| 6,359,892 B1 | * | 3/2002 | Szlam | 370/401 |
| 6,398,028 B1 | * | 6/2002 | Stovall | 206/390 |
| 6,430,289 B1 | * | 8/2002 | Liffick | 370/352 |
| 6,453,038 B1 | * | 9/2002 | McFarlane et al. | 379/265.05 |
| 6,466,782 B2 | * | 10/2002 | Ishikawa et al. | 455/412 |
| 6,721,407 B1 | * | 4/2004 | Michelena | 379/142.08 |

* cited by examiner

Primary Examiner — Gerald Gauthier
(74) Attorney, Agent, or Firm — Ward & Olivo (57) ABSTRACT

A system, method, and computer program product are provided for conveying availability information of a calling party to a called party. A PBX serving the telephones of the calling and called parties is connected to a presence server. In an embodiment of the invention, the presence server is also connected to a computer and/or other information device (such as a personal data assistant or telephone) of the calling party. After the calling party has left a voice mail message for the called party, the called party will subsequently retrieve the message. In an embodiment of the invention, the PBX then queries the presence server as to the availability of the calling party. The presence server senses whether the calling party has indicated his or her presence; if so, it is inferred that the calling party is probably present and available for a return call. If the presence server detects no such indication by the calling party, it is inferred that the calling party is likely to be absent. The presence server responds to the query of the PBX by indicating the calling party's likely availability (or absence) to the PBX. Based on this information, the PBX modifies the voice mail message to include a statement that the calling party is either available or unavailable.

23 Claims, 10 Drawing Sheets

SYSTEM, METHOD AND COMPUTER PROGRAM PRODUCT FOR CONVEYING PRESENCE INFORMATION VIA VOICE MAIL

BACKGROUND OF THE INVENTION

1. Field of the Invention

The invention described herein relates to communications. In particular, the invention relates to telephony and voice mail.

2. Related Art

In the course of day to day activities, a person is often faced with having to establish timely contact with another party. There may be an urgent need to convey information or ask a question. At such times, the communications appliance of choice is usually the telephone.

There are times, however, when a called party is not present to answer. In such a case, the caller can leave a recorded message if the called party is appropriately equipped. Today, people commonly have voice mail. This enables the caller to leave a message that is stored in memory at a private branch exchange (PBX) servicing the called party. When the called party returns to his telephone, he is informed that a message is waiting for him. The called party then accesses the PBX to hear the message.

At this point, direct communication can be further delayed if the called party returns the call, only to find that the original caller is not present. What sometimes follows is the modem day phenomenon of "telephone tag": a series of calls between the parties, in which messages are left by each party for the other. Eventually, after what may be considerable time and frustration, a fortuitous call occurs in which both parties happen to be present and available. Then, at last, the desired conversation can take place.

What is needed, therefore, is a system and method in which a called party listening to a voice mail message can be told whether the original calling party is currently available. The called party can then return the call if he knows that the calling party is available. This would prevent the time consuming sequence of calls and return calls. In the work environment, this would facilitate greater efficiency and productivity among employees.

SUMMARY OF THE INVENTION

The invention described herein is a system, method, and computer program product for providing availability information of a calling party to a called party. A PBX serving the telephones of the calling and called parties is connected to a presence server. In an embodiment of the invention, the presence server is also connected to a computer and/or other information devices, e.g., a personal data assistant (PDA) or telephone, of the calling party.

After the calling party has left a voice mail message for the called party, the called party will subsequently retrieve the message. In an embodiment of the invention, the PBX then queries the presence server as to the availability of the calling party. The presence server senses whether the calling party has indicated his or her presence via the computer or other information device. If so, it is inferred that the calling party is probably present and available for a return call. If the presence server detects no such activity, it is inferred that the calling party is likely to be absent. The presence server responds to the query of the PBX by indicating the calling party's likely availability (or absence) to the PBX. In an embodiment of the invention, the PBX further determines whether the calling party is using his telephone. If so, it can be inferred that the calling party is present but unavailable for a return call from the called party. Based on the data available to the PBX (e.g., information from the presence server and information regarding current telephone usage by the calling party), the PBX modifies the voice mail message to include a statement that the calling party is either available or unavailable. In the latter case, for example, the statement can indicate that the calling party appears not to be present, or is present but in another call.

The invention has the feature of a presence server that determines the likely availability of a calling party. The invention has the additional feature of connecting a PBX with the presence server. In an alternative embodiment, the functionality of the presence server can be integrated into the PBX. The invention has the advantage of allowing a called party to retrieve a voice mail message that states whether the original caller is likely to be available for a return call.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Introduction

The invention described herein is a system, method, and computer program product that allows the availability of a party to be conveyed through voice mail. With this invention, a called party can retrieve a voice mail message, and receive not only the message left by a calling party, but also an indication as to whether the calling party is currently available to take a return call. The invention uses a presence server to detect the presence or absence of the calling party. In an embodiment of the invention, every party in a community of users has a desk top computer or other information device (such as a telephone or PDA). A network, such as a local area network (LAN), connects the information devices throughout the community. The presence server is also connected to the network. Using the network, the presence server can detect whether the calling party has indicated his or her presence via the information device. If so, then the inference is made that the calling party is present, i.e., at his desk. This availability information can then be conveyed to a private branch exchange (PBX). When the called party accesses his voice mail, the PBX can incorporate availability information regarding the calling party into the voice mail message Alternatively, the presence server is connected, via the network, to one or more other information devices of the calling party, in addition to (or instead of) the calling party's computer. In this case, the presence server detects whether the calling party has indicated his or her presence via the information device. The presence server then conveys availability information to the PBX on the basis of the indication.

II. System

Figure 1:
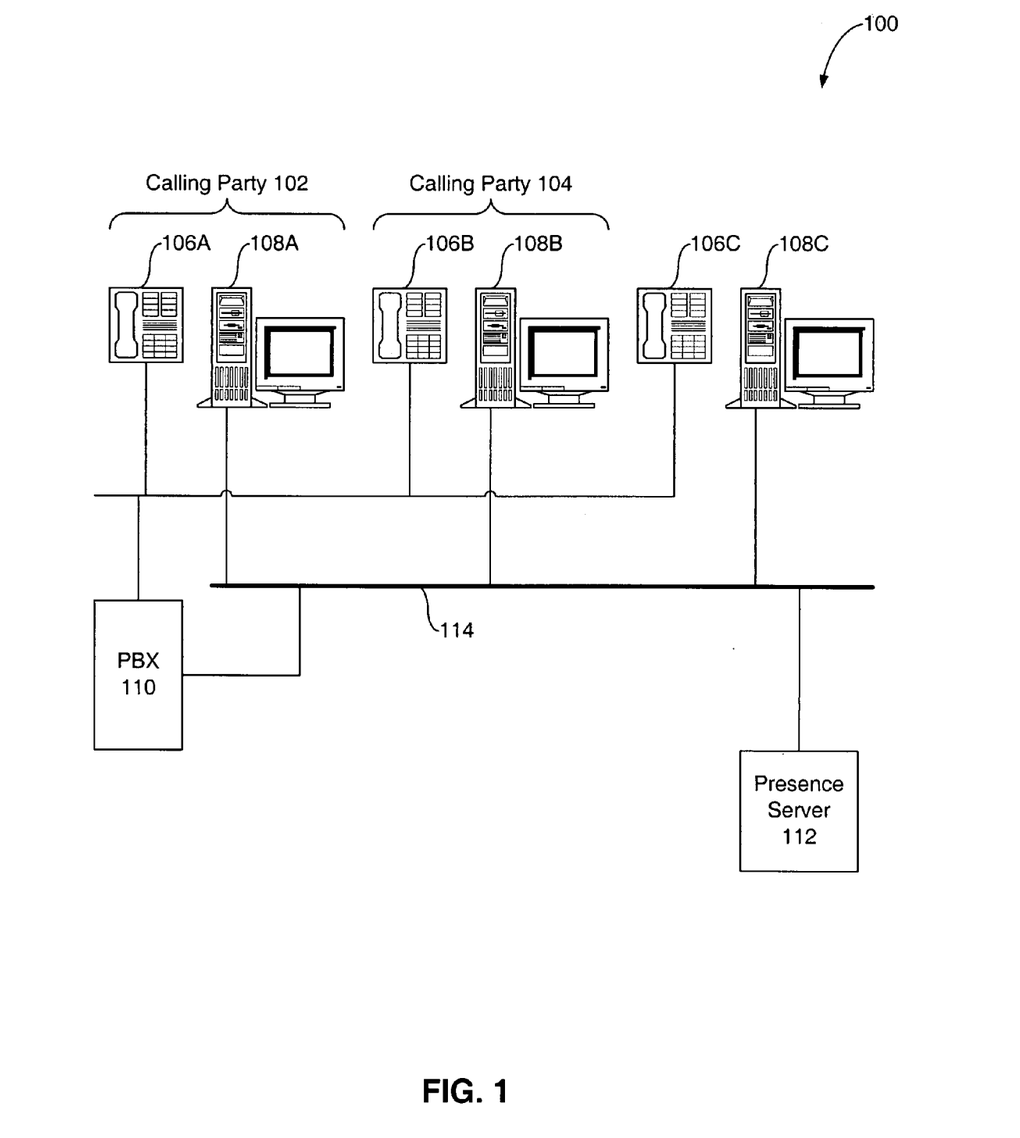
FIG. 1 illustrates the overall architecture of an embodiment of the invention.

An embodiment of the present invention is illustrated generally in FIG. 1, as system 100. In an exemplary scenario, a calling party 102 attempts to reach a called party 104. To do this, calling party 102 uses telephone 106A to ring telephone 106B of called party 104. A PBX 110 services telephones 106A, 106B, and 106C. If called party 104 is unable to answer his telephone 106B, then calling party 102 leaves a voice mail message for called party 104. The message is stored physically at PBX 110 at a memory location allocated to called party 104.

Using telephone 106B, called party 104 can subsequently access the voice mail message at PBX 110. Upon doing so, PBX 110 queries a presence server 112 in an embodiment of the invention. Both PBX 110 and presence server 112 are connected to a network infrastructure 114, such as a LAN or other form of network, which permits such communication between PBX 110 and presence server 112. In the illustrated embodiment, presence server 112 is also connected to computers 108A, 108B and 108C, via network infrastructure 114. Given this connectivity, presence server 112 is able to sense whether calling party 102 has indicated his presence. In an embodiment of the invention, presence is indicated by use of computer 108A. Alternatively, presence is indicated by a deliberate action of calling party 102, such as the setting of a logical flag in computer 108A. Based on the presence indication (or lack thereof), presence server 112 informs PBX 110 as to whether calling party 102 is likely to be available. PBX 110 then appends an indication of the likely availability of calling party 102 to the voice mail message heard by called party 104.

In alternative embodiments, presence server 112 is connected (via network infrastructure 114) to one or more other information devices of calling party 102, in addition to (or instead of) computer 108A. Such devices can include, for example, a telephone or PDA of calling party 102. In a manner similar to the operation described above, presence server 112 would sense whether calling party 102, using such an information device, has indicated his presence. Presence server 112 would then inform PBX 110 accordingly.

As discussed above, in an embodiment of the invention, calling party 102 can indicate his presence by a deliberate action at computer 108A or at some other information device connected to presence server 112. In such an embodiment, logic may be present in the information device to set the appropriate flag in the device and to convey the presence of calling party 102 to presence server 112. This logic can be viewed as a presence management client that interacts with presence server 112. The operation of such logic is described in greater detail below with respect to FIG. 2.

Figure 2:
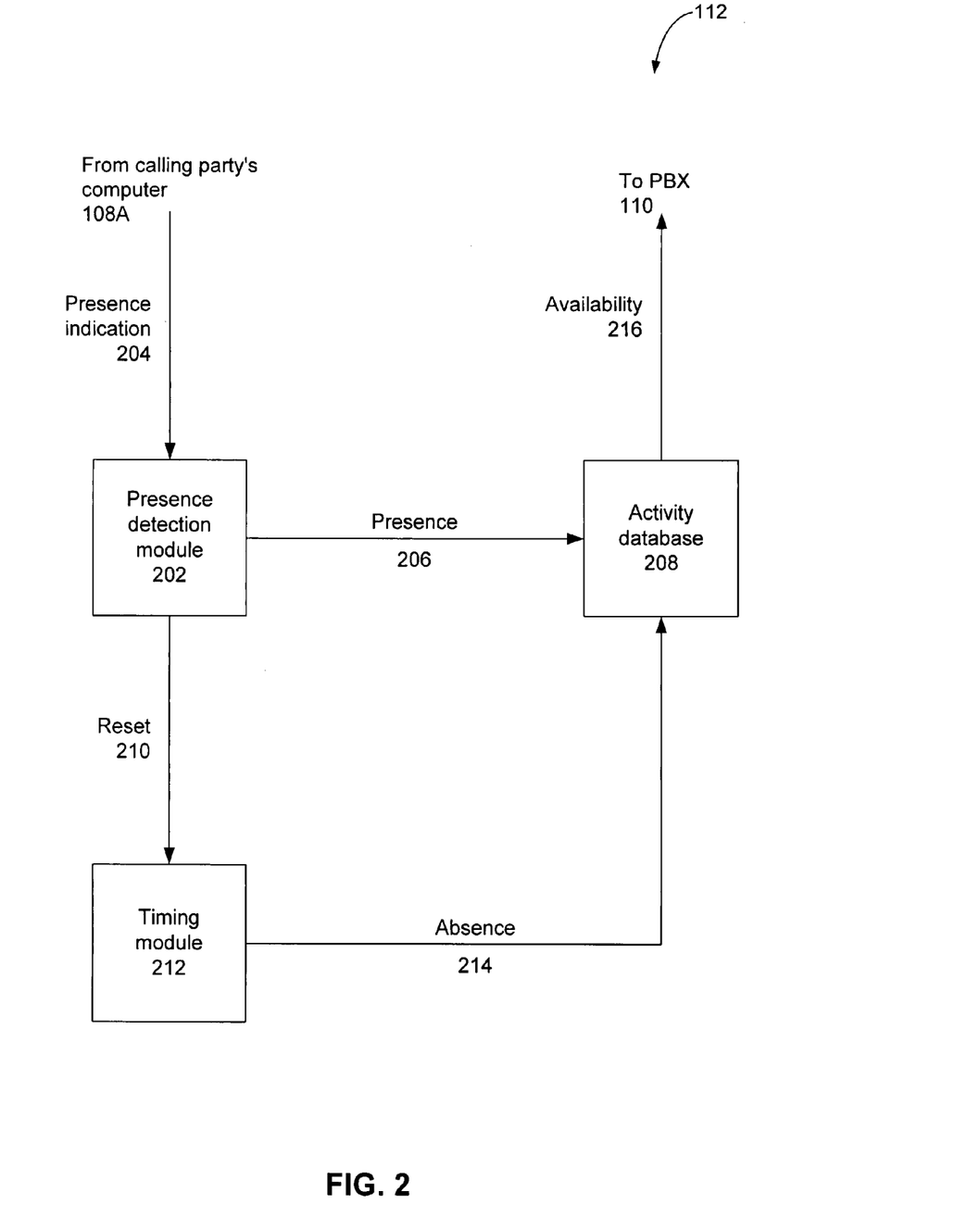
FIG. 2 is a block diagram illustrating the functional components of the presence server, according to an embodiment of the invention in which presence is inferred by detecting routine activity of the calling party.

An embodiment of presence server 112 is illustrated in greater detail in FIG. 2. In this embodiment, the presence of calling party 102 is inferred by activity at computer 108A or at some other information device connected to presence server 112. Presence server 112 includes a presence detection module 202. Presence detection module 202 detects activity of calling party 102 at an information device of calling party 102. The activity sensed by presence detection module 202 can be an action that takes place in the course of normal activity. Such activity may include, for example, key strokes at a keyboard, movement of a cursor, clicks of a mouse button, or any other user interaction at an information device connected to presence server 112.

Upon receipt of presence indication 204, presence detection module 202 informs activity database 208 that calling party 102 is using his computer or other information device and is therefore presumably present at his desk. To inform activity database 208 of this, presence detection module 202 sends a presence message 206 to activity database 208. Activity database 208 serves as a repository for information as to the availability of parties. After receipt of presence message 206, activity database 208 records the fact that calling party 102 appears to be present. Also, presence detection module 202 sends a reset message 210 to timing module 212. Timing module 212 measures the time elapsed since the most recent activity of calling party 102. Upon receipt of reset message 210, timing module 212 is reset to zero.

If a predetermined amount of time (e.g., two minutes) elapses after a presence indication without any further presence indications, then timing module 212 sends an absence message 214 to activity database 208. This is because the lack of recent activity suggests that calling party 102 is probably not present. When absence message 214 is received, activity database 208 records the fact that calling party 102 appears to be absent. Presence server 112 then sends availability information 216 to PBX 110. Availability information 216 informs PBX 110 that calling party 102 is likely to be either present or absent. In an embodiment of the invention, the transfer of availability information 216 to PBX 110 occurs in response to a query from PBX 110. In an alternative embodiment, the transfer of availability information 216 to PBX 110 occurs as soon as activity database 208 receives presence message 206 or absence message 214, without requiring a query by PBX 110. In yet another embodiment, the current availability information 216 is sent to PBX 110 periodically in the form of regular updates.

Alternatively, the mere fact that computer 108A (or other information device) is powered on can be treated as user activity for purposes of presence detection module 202. Alternatively, the presence of calling party 102 could be detected bodily, through a motion detector based on ultrasound technology, or through detection of infrared radiation given off by calling party 102. Whatever the mechanism for detecting activity, a presence indication 204 is conveyed from the mechanism to presence detection module 202 in the event of any such activity.

In an alternative embodiment of the invention (not shown), certain events can suggest that calling party 102 is not present. One such event is the activation of a screen saver. A screen saver is typically activated by a user, e.g., calling party 102, when the user leaves his computer for an extended time, or is activated automatically by the computer when no activity has been detected for a predetermined interval. Activation of a screen saver therefore implies that calling party 102 is unavailable. In this embodiment, activation of a screen saver triggers an inactivity indication that is conveyed to presence detection module 202. This results in presence detection module sending an absence message 214 to activity database 208.

The functionality of presence server 112 can be incorporated into PBX 110 in an alternative embodiment (not shown). Here, presence detection module 202, timing module 212, and activity database 208 or their functional equivalents are contained in PBX 110. In such an embodiment, presence indications would be received by presence detection module 202 within PBX 110.

Figure 3:
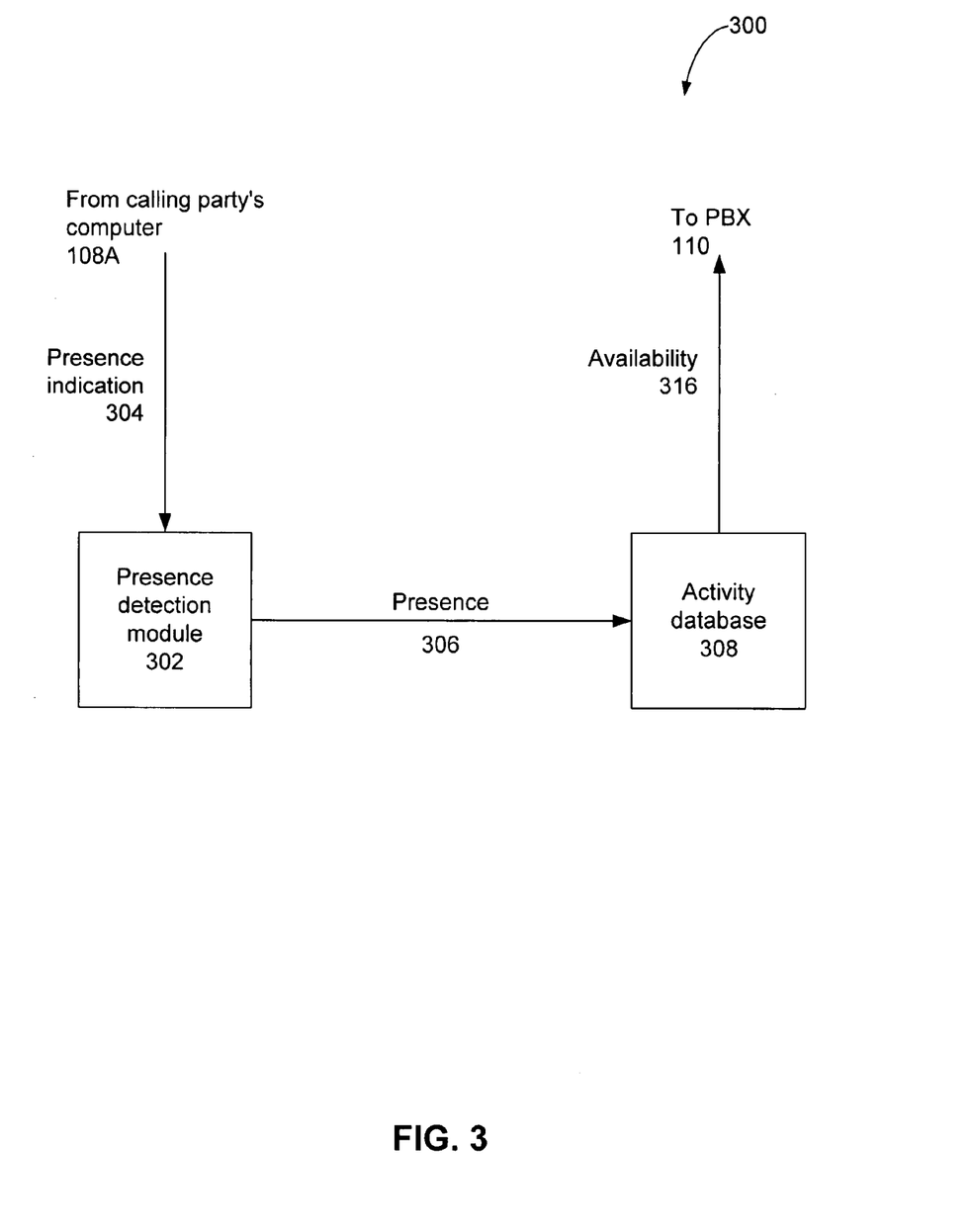
FIG. 3 is a block diagram illustrating the functional components of the presence server, according to an embodiment of the invention in which presence is explicitly signified by a deliberate action of the calling party.

In alternative embodiments of the invention, the presence of calling party 102 can be detected using means other than routine activity. For example, calling party 102 could be required to overtly indicate arrivals and departures by toggling a logical flag in an information device connected to presence server 112. For example, this indication could take the form of setting a hardware switch or clicking a button on a graphical user interface of the information device. The presence server for such an embodiment of the invention is illustrated in FIG. 3. By setting a logical flag at computer 108A or at another information device, a presence indicator 304 is generated at the information device and sent to presence detection module 302. As a result, a presence detection message 306 is generated by presence detection module 302 and sent to an activity database 308, which records the apparent presence of calling party 102. Availability information 316 is then sent from activity database 308 to PBX 110. The sending of availability information 316 to PBX 110 can be done as soon as presence detection message 306 is received from presence detection module 302; alternatively, availability information 316 can be sent to PBX 110 in response to a query from PBX 110. In an embodiment of the invention, calling party 102 can likewise reset the logical flag to indicate an impending absence. This would result in absence information being sent to PBX 110 in a manner analogous to that of availability information 316.

Note that PBX 110 has additional functionality beyond that of a commercially available PBX. As described above, PBX 110 interfaces with presence server 112. Through this interface, PBX 110 receives availability information regarding calling party 102 from presence server 112. Moreover, PBX 110 is able to include the availability information into the message left by called party 104, and convey the modified message to called party 104.

III. Method

Figure 4:
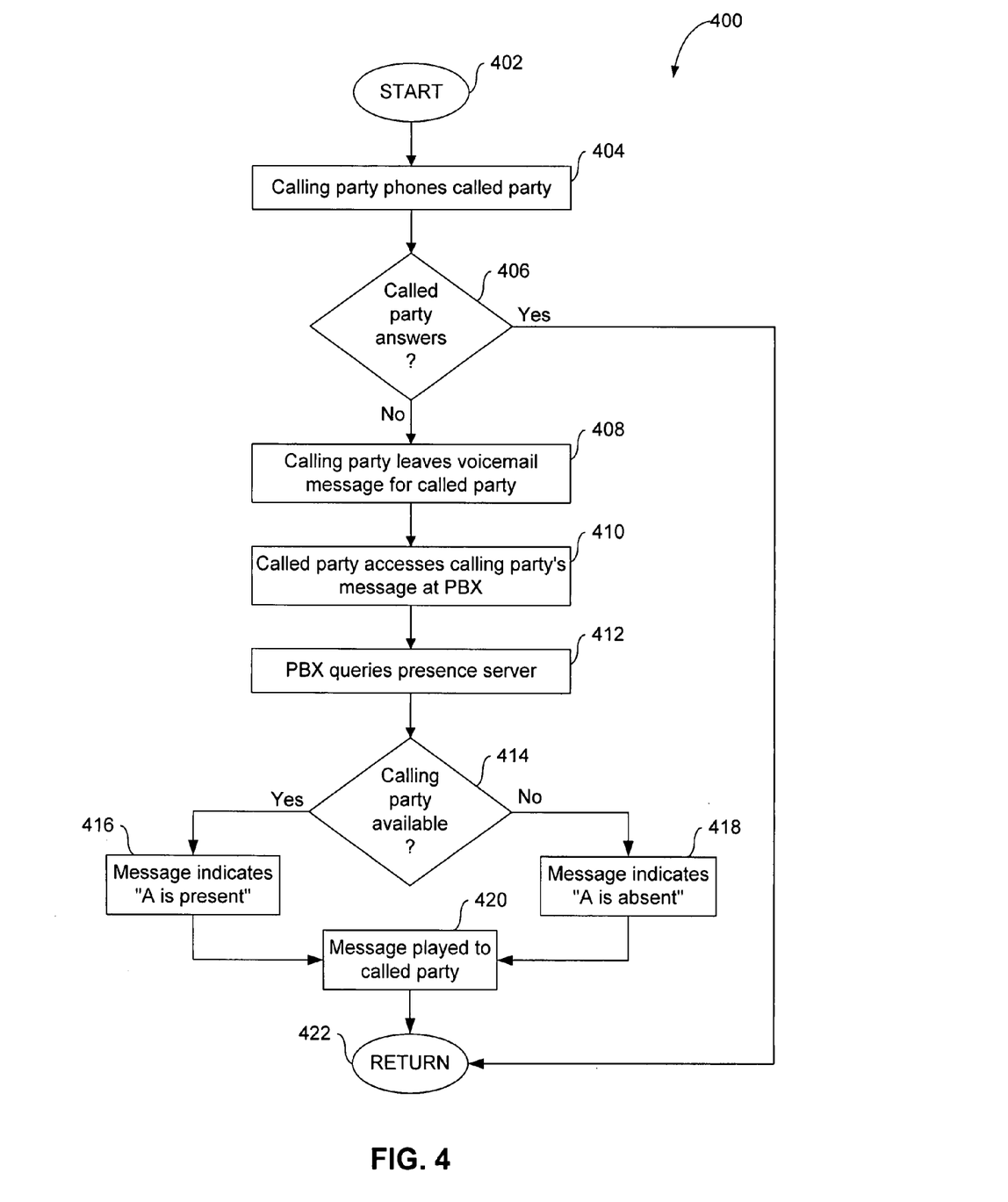
FIG. 4 is a flowchart illustrating the overall method of an embodiment of the invention.

The method of the invention, according to one embodiment, is illustrated in general in FIG. 4. The method begins with step 402. In step 404, a calling party telephones a called party. In step 406, the called party may or may not answer. If the called party answers, then the method concludes at step 422. If, however, the called party does not answer, then the method continues at step 408. In step 408, the calling party leaves a voice mail message for the called party. As discussed above, the voice mail message is recorded physically at a PBX. In step 410, the called party subsequently accesses the calling party's message at the PBX. In step 412, the PBX queries the presence server as to whether the calling party is available for a call back from the called party. In step 414, a determination is made regarding the calling party's availability. This step will be discussed in greater detail below. If the calling party is available, then processing continues at step 416, where the message originally left by the calling party is edited to include a statement that the calling party is available. If, however, the calling party is determined not to be available in step 414, then processing continues at step 418. Here the message originally left by the calling party is edited to include a statement that the calling party is absent. At step 420, the message, edited in either of steps 416 or 418, is played to the called party. The processing concludes at step 422.

Note that in an alternate embodiment of the invention, a query method (e.g., step 412) is not used. Rather, the current likely availability of the calling party can be sent to the PBX as soon as it is known, or on a periodic basis. In this manner, the PBX can be automatically updated regarding the calling party's availability. The PBX can then modify a voice mail message as appropriate, without having to query the presence server.

Figure 5:
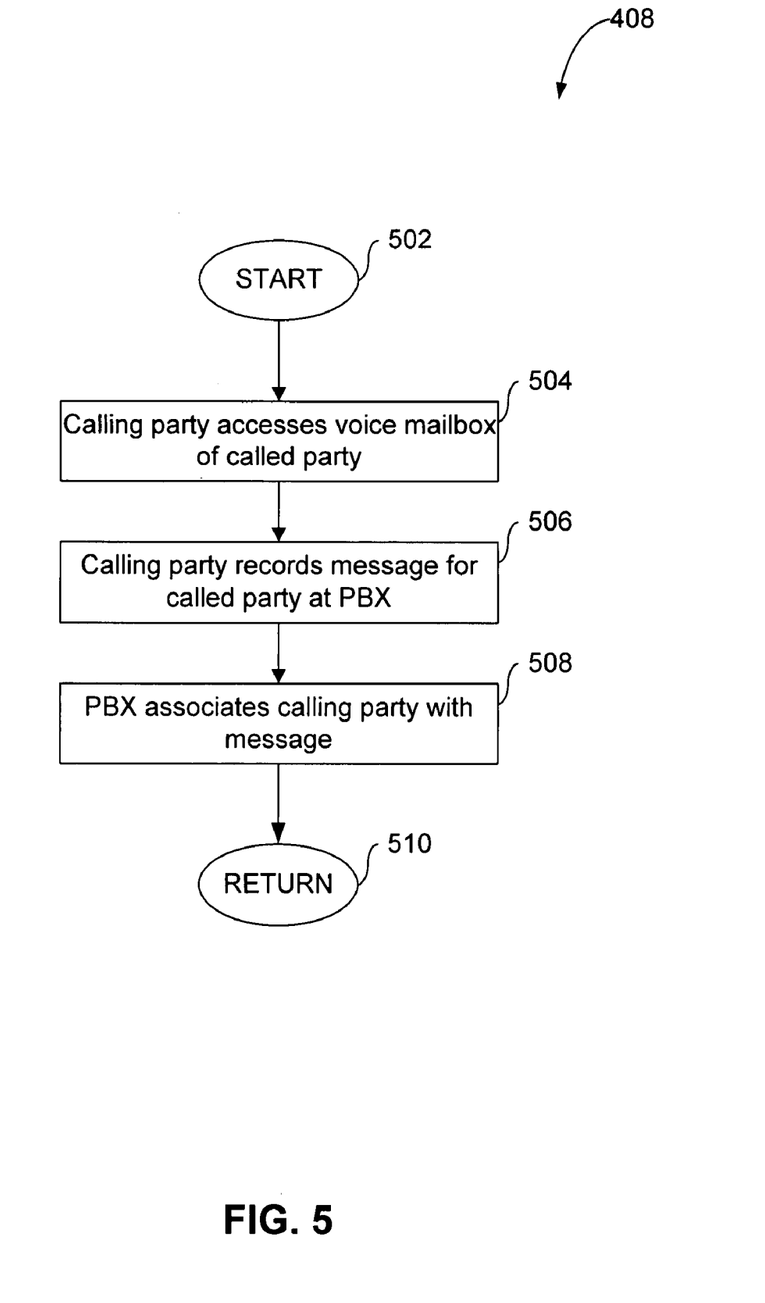
FIG. 5 is a flowchart illustrating the method by which a calling party leaves a message, according to an embodiment of the invention.

An embodiment of step 408 above, the step of leaving a voice mail message for the called party, is illustrated in greater detail in FIG. 5. The processing begins at step 502. In step 504, the calling party accesses the voice mailbox of the called party. In step 506, the calling party records a message for the called party at the PBX. In step 508, the PBX associates the identity of the calling party with the message left by the calling party. When the called party subsequently accesses this message, this association allows the PBX to make a specific query to the presence server as to whether the party associated with the message (i.e., the calling party) is available. The method concludes with step 510.

Figure 6:
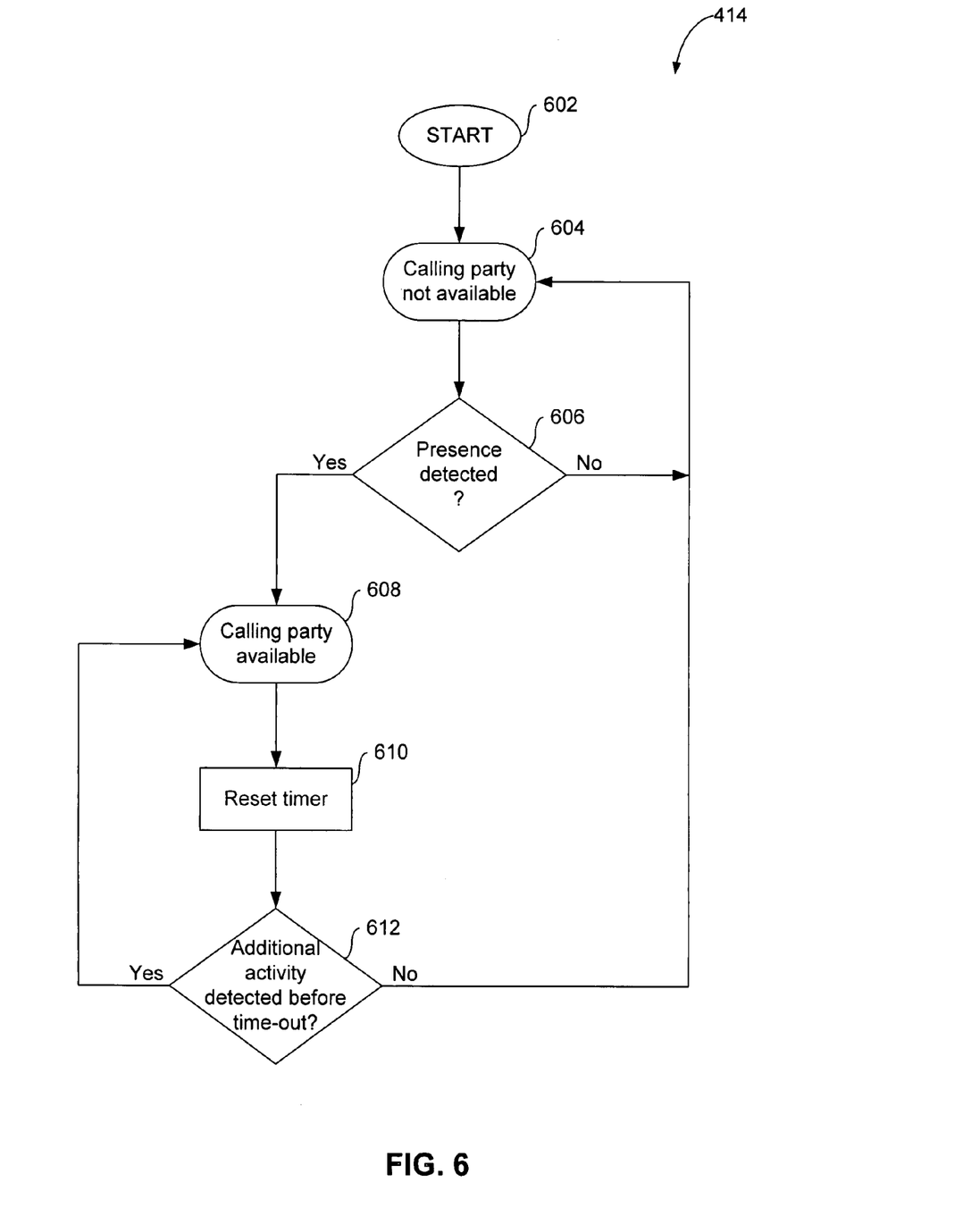
FIG. 6 is a flowchart illustrating the method of determining the availability of a calling party, according to an embodiment of the invention in which presence is inferred by detecting routine activity of the calling party.
Figure 7:
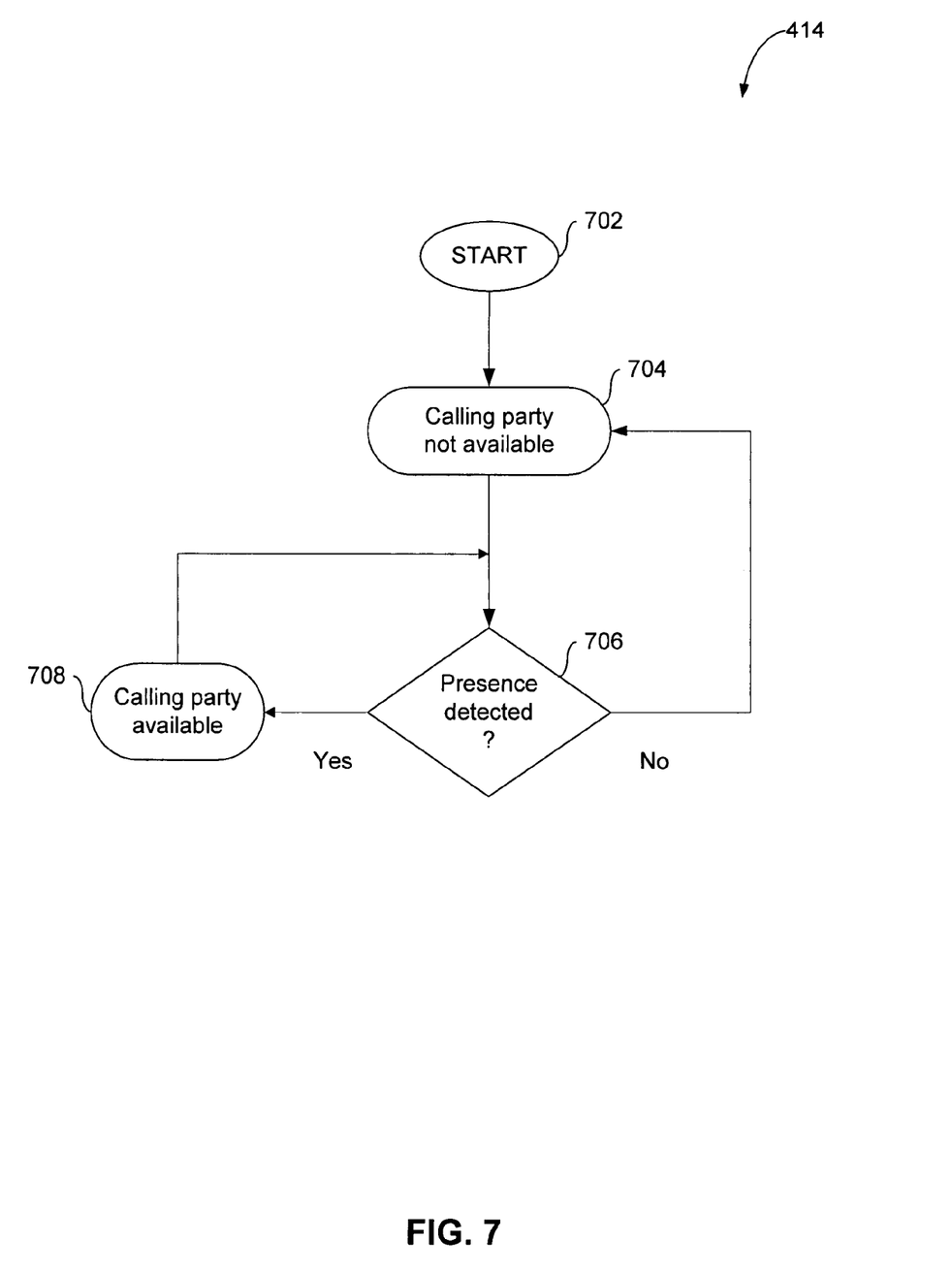
FIG. 7 is a flowchart illustrating the method of determining the availability of a calling party, according to an embodiment of the invention in which presence is explicitly signified by a deliberate action of the calling party.

An embodiment of step 414, the determination of whether or not a calling party is available, is illustrated in greater detail in FIG. 6. The method begins at step 602. In step 604, the calling party is initially assumed to be unavailable. In step 606, a determination is made as to whether or not there is activity on the part of the calling party. In an embodiment of the invention, the presence server waits passively for a presence indication; in an alternative embodiment, the presence server actively queries the information device of the calling party for a presence indication. In either case, if no activity is detected, then processing returns to step 604. If, however, activity on the part of the calling party is detected in step 606, then processing proceeds to step 608. In step 608, the calling party is identified as being available. In step 610, the timing module is reset. In step 612, a determination is made as to whether additional activity on the party of the calling party is detected before a predetermined time interval (e.g., two minutes) elapses. If additional activity is detected before this period elapses then the method returns to step 608, where the calling party is again identified as being available. If, however, no additional activity is detected in step 612 on the part of the calling party before the predetermined interval elapses, then the method returns to step 604. As discussed above, in step 604, the calling party is identified as being unavailable. Note that step 414, as illustrated in FIG. 7, can be viewed as a state machine. At any given point in the method, the calling party is determined to be either available or not available.

Whether or not a calling party is determined to be available depends on activity of the calling party, as detected by the system described above. Recent activity on the part of the calling party implies that the calling party is probably available; the absence of activity on the part of the calling party implies that the calling party is probably not available.

As discussed above, in an alternative embodiment of the invention, a calling party can indicate his presence by setting a logical flag in a computer or other information device In such an embodiment, step 414 can be performed as illustrated in FIG. 7. The method begins with step 702. In step 704, the calling party is initially assumed to be unavailable. In step 706, a determination is made as to whether or not there is activity on the part of the calling party. In an embodiment of the invention, the presence server waits passively for a presence indication; in an alternative embodiment, the presence server actively queries the information device of the calling party for a presence indication. In either case, if no activity is detected, then processing returns to step 704. If, however, activity on the part of the calling party is detected in step 706, then processing proceeds to step 708. In step 708, the calling party is identified as being available. Presence is then polled again in step 706.

Figure 8:
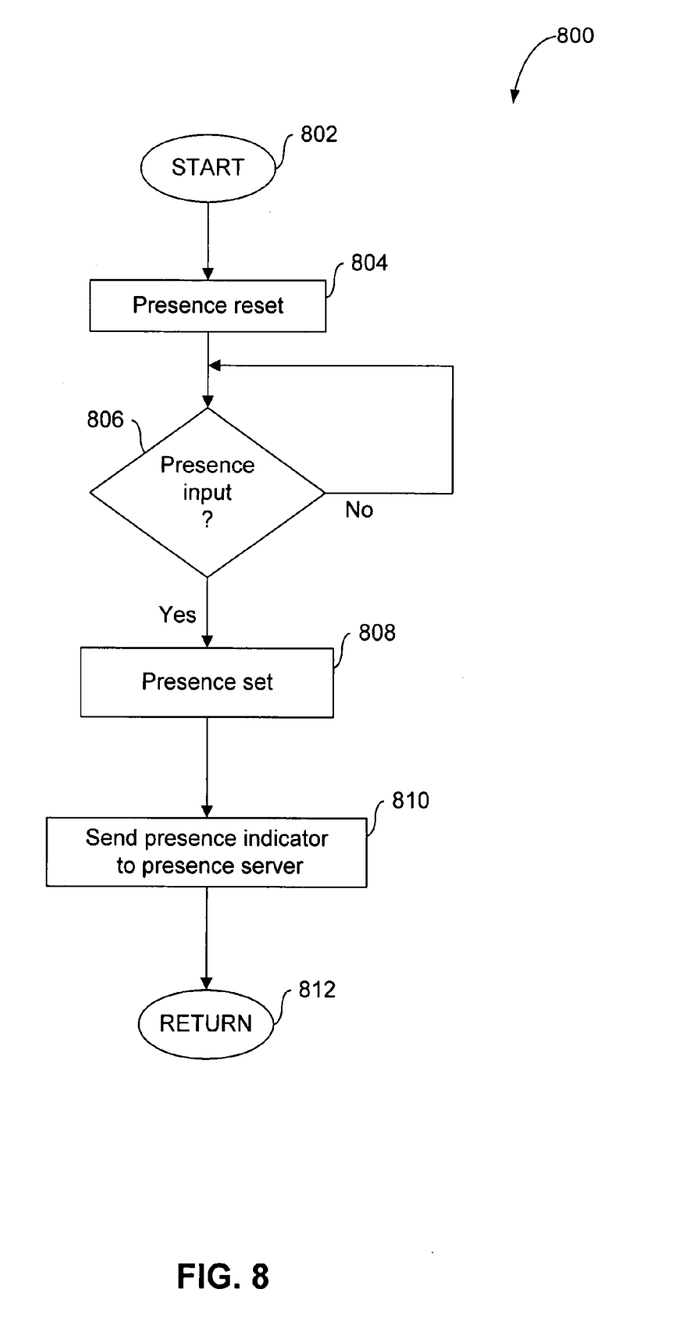
FIG. 8 is a flowchart illustrating the operation of a presence management client, according to an embodiment of the invention.

In such an embodiment, logic may be present in the information device to set the appropriate flag in the device and to convey the presence of the calling party to the presence server. This logic can be viewed as a presence management client that interacts with the presence server. The operation of such logic, whether implemented in hardware or software, is illustrated generally in FIG. 8 as method 800. Method 800 begins with step 802. In step 804, a logical flag is initially reset to indicate the absence of the calling party by default. In step 806, a determination is made as to whether the calling party has signified his presence. The calling party could, for example, indicate his presence through an input to a graphical user interface. If presence is not indicated, step 806 is repeated to poll for such an indication. If presence is indicated, the method continues at step 808, where the logical flag is set. In step 810, a presence indicator is conveyed to the presence server. Method 800 concludes at step 812.

Figure 9:
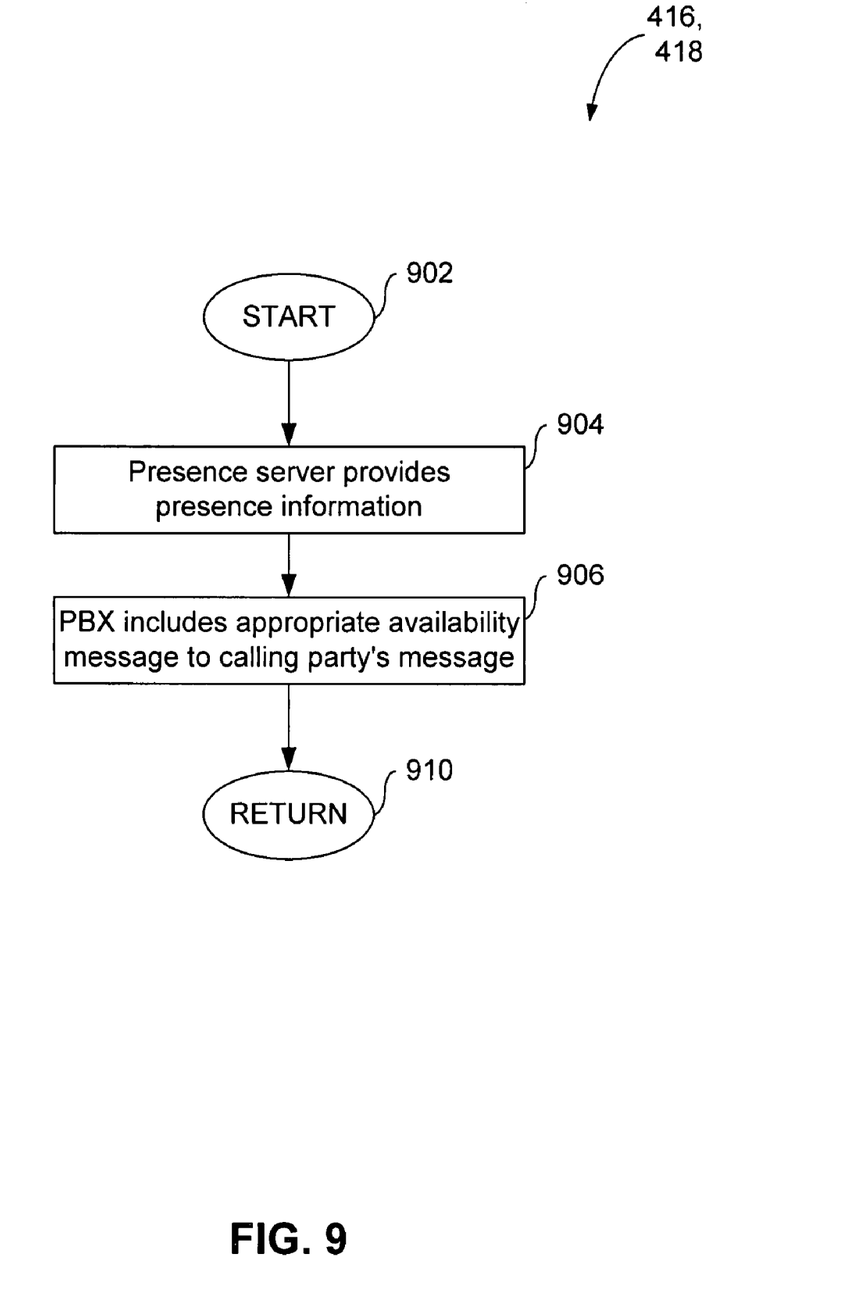
FIG. 9 is a flowchart illustrating the method of including appropriate availability information in a voice mail message, according to an embodiment of the invention.

Step 416, the step of modifying the voice mail message to include an indication that the calling party is present, is illustrated in greater detail in FIG. 9. In step 902, the method begins. In step 904, the presence server provides presence information as described above. In step 906, the PBX adds appropriate availability information to the message left by the calling party. In this case, the availability of the calling party would be indicated. In step 908, this modified message is presented to the called party. The method concludes at step 910. Note that step 418, the step of including an indication that the calling party is absent, is analogous to the processing of step 416. One difference, however, is the nature of the information added in step 906 to the originally recorded message.

IV. Environment

Figure 10:
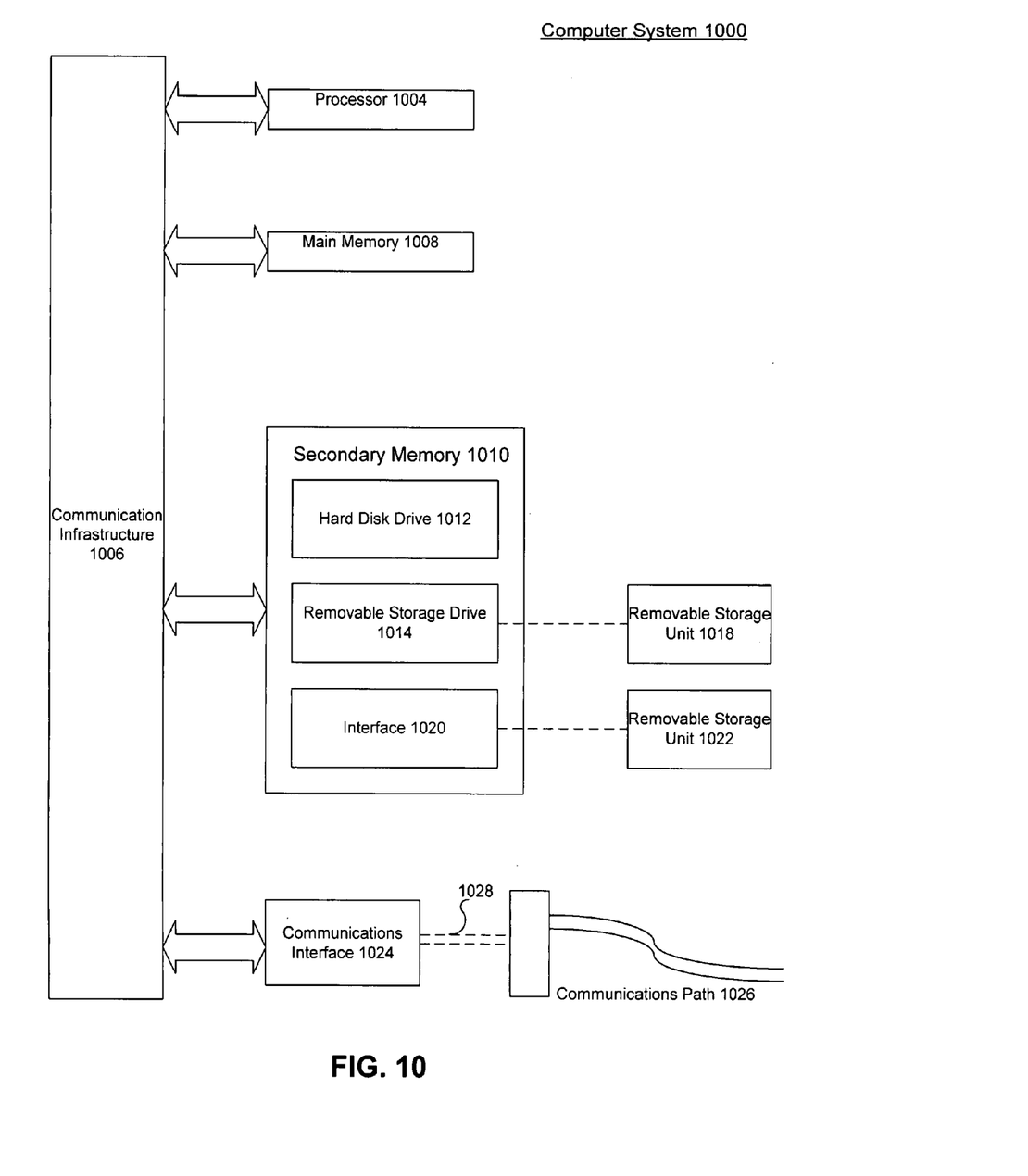
FIG. 10 illustrates an exemplary computing environment, according to an embodiment of the invention.

The presence server of the present invention may be implemented using hardware, software or a combination thereof and may be implemented in a computer system or other processing system. An example of such a computer system 1000 is shown in FIG. 10. The computer system 1000 includes one or more processors, such as processor 1004. The processor 1004 is connected to a communication infrastructure 1006 (e.g., a bus or network). Various software embodiments can be described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc. As will be appreciated, the removable storage unit 1018 includes a computer usable storage medium having stored therein computer software and/or data.

Secondary memory 1010 can also include other similar means for allowing computer programs or input data to be loaded into computer system 1000. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which maybe electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a phone line, a cellular phone link, an RF link and other communications channels. In an embodiment of the invention, signals 1028 entering the presence server can include queries from the PBX regarding the availability of a calling party. Incoming signals 1028 can also include presence indications from an information device of a called party Outgoing signals 1028 can include availability information regarding the calling party.

In this document, the terms "computer program medium" and "computer usable medium" are used to generally refer to media such as removable storage drive 1014, a hard disk installed in hard disk drive 1012, and signals 1028. These computer program products are means for providing software to computer system 1000. The invention is directed to such computer program products.

Computer programs (also called computer control logic) are stored in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

The PBX of the present invention may also be implemented using hardware, software or a combination thereof and may be implemented in a computer system or other processing system. Using computer system 1000 once again as an embodiment of such a computer system, outgoing signals 1028 could include queries to the presence server regarding the availability of the called party. Incoming signals 1028 could include availability information from the presence server.

V. Data Network Embodiment

The above description of the invention is presented in the context of a to traditional telephone voice network. However, voice signals in digital form can be conveyed over data networks, such as wide-area networks (WANs) and/or the internet. The invention can be applied in such an environment as well.

Application in this environment permits variations implementation. For example, when a calling party leaves a message in the mailbox of a called party, the identity of the calling party can be obtained by querying the calling party. The identity information can then be associated with the message.

VI. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A system for providing presence information of a calling party to a called party, said presence information indicating that said calling party is currently present at a telephone, said system comprising:
   a private branch exchange (PBX) serving telephones of the calling and called parties;
   a presence server connected to an information device of the calling party and detecting presence of the calling party;
   a communications path between said PBX and said presence server, allowing presence information to be sent from said presence server to said PBX; and
   a memory associating said presence information with a voice mail message.

2. The system of claim 1, wherein said presence server comprises:
   a presence detection module that can receive a presence indication from said information device of the calling party; and
   an activity database that maintains availability information regarding the calling party, wherein said availability information is updated by said presence detection module.

3. The system of claim 1, wherein said presence server comprises:
   a presence detection module that can receive a presence indication from said information device of the calling party;
   an activity database that maintains availability information regarding the calling party, wherein said availability information is updated by said presence detection module and;
   a timing module that measures the time elapsed between the entrance of said activity database.

4. The system of claim 2, wherein said presence indication is generated explicitly by the calling party through a deliberate action to indicate presence of the calling party.

5. The system of claim 1, wherein said PBX and said presence server are embodied as a single device.

6. The system of claim 3, wherein said presence indication is generated explicitly by the calling party through a deliberate action to indicate presence of the calling party.

7. A voice messaging system, comprising:
   means for receiving presence information about a calling party from an information device associated with said calling party, said presence information indicating that said calling party is currently present at a telephone of the calling party;
   means for associating said presence information with a voice message left by said calling party; and
   means for providing said presence information to a called party in connection with playback of said voice message.

8. A method of using a voice mail message to provide availability information of a calling party to a called party, said availability information indicating whether (i) said calling party is currently present at a telephone and (ii) said telephone's status is available, said method comprising the following steps performed after the calling party has left a voice mail message for the called party:
   (a) receiving availability information regarding the calling party from a presence server; and
   (b) including the availability information in the voice mail message.

9. The method of claim 8, further comprising the following step, performed before step (a):
   (c) determining the presence of the calling party.

10. The method of claim 9 wherein said step (c) comprises:
    i. detecting whether there has been activity on the part of the calling party within a defined period;
    ii. when activity is detected within the defined period, indicating that the calling party is likely to be present; and
    iii. when no activity has been detected within the defined period, indicating that the calling party is not likely to be present.

11. The method of claim 10, wherein said step (i) comprises sensing use of an information device of the calling party.

12. The method of claim 9, wherein said step (c) comprises detecting a deliberate action by the calling party, wherein the action explicitly indicates presence.

13. The method of claim 8, further comprising the following step, performed before step (a):
    (c) querying the presence server regarding the availability of the calling party.

14. The method of claim 8, further comprising the following step, performed before step (a):
    (c) associating the calling party with the voice mail message left by the calling party.

15. A method for conveying presence information via voice mail, said presence information indicating that said calling party is currently present at a telephone of the calling party, said method comprising:
    (a) receiving presence information about a calling party from an information device associated with the calling party; and
    (b) associating the presence information with a voice mail message left by the calling party.

16. The method of claim 15, wherein said step (b) comprises:
    associating the presence information with the calling party so that the presence information is provided to a called party in connection with playback of the voice message.

17. The method of claim 15, further comprising the following step, performed before said step (a):
(c) querying the information device for presence information.

18. The method of claim 15, wherein the presence information is received as a result of activity by the calling party.

19. The method of claim 18, wherein the activity comprises a deliberate action by the calling party to explicitly indicate presence.

20. A computer program product comprising a computer usable medium having computer readable program code means embodied in said medium for causing an application program to execute on a computer that provides availability information of a calling party to a called party through a voice mail message, said availability information indicating whether (i) said calling party is currently present at a telephone and (ii) said telephone's status is available, said computer readable program code means comprising:
first computer readable program code means for causing a private branch exchange (PBX) to receive availability information from, a presence server; and
second computer readable program code means for causing the PBX to include the received availability information in the voice mail message.

21. A computer program product comprising a computer usable medium having computer readable program code means embodied in said medium for causing an application program td execute on a computer that provides availability information of a calling party to a called party through a voice mail message, said computer readable means comprising:
first computer readable program code means for causing a private branch exchange (PBX) to receive availability information from a presence server;
second computer readable program code means for causing the PBX to include the received availability information in the voice mail message; and
third computer readable program code means for causing the PBX to query the presence server regarding the availability of the calling party.

22. A computer program product comprising a computer usable medium having computer readable program code embodied in said medium for causing an application program to execute on a computer that provides availability information of a calling party to a called party through a voice mail message, said computer readable program code comprising:
first computer readable program code adapted to cause a private branch exchange (PBX) to receive availability information from a presence server;
second computer readable program code adapted to cause the PBX to include the received availability information in the voice mail message; and
third computer readable program code means adapted to cause the PBX to query the presence server regarding the availability of the calling party.

23. A method for conveying presence information via a voice mail message, said presence information indicating that a calling party is currently present at a telephone of the calling party, said method comprising:
(a) querying an information device associated with the calling party for presence information in response to a called party requesting playback of the voice mail message;
(b) receiving presence information about the calling party from said information device associated with the calling party; and
(c) associating the presence information with the calling party.

* * * * *